(12) United States Patent
Farrell

(10) Patent No.: US 10,370,533 B2
(45) Date of Patent: Aug. 6, 2019

(54) THERMOPLASTIC COMPOSITION AND LASER-WELDED ARTICLE

(71) Applicant: SABIC GLOBAL TECHNOLOGIES B.V., Bergen op Zoom (NL)

(72) Inventor: Tony Farrell, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 36 days.

(21) Appl. No.: 15/307,945

(22) PCT Filed: May 19, 2015

(86) PCT No.: PCT/IB2015/053687
§ 371 (c)(1),
(2) Date: Oct. 31, 2016

(87) PCT Pub. No.: WO2015/186015
PCT Pub. Date: Dec. 10, 2015

(65) Prior Publication Data
US 2017/0088708 A1    Mar. 30, 2017

Related U.S. Application Data

(60) Provisional application No. 62/008,134, filed on Jun. 5, 2014.

(51) Int. Cl.
*C08L 67/02* (2006.01)
*C08L 69/00* (2006.01)
(Continued)

(52) U.S. Cl.
CPC ............... *C08L 67/02* (2013.01); *C08K 5/132* (2013.01); *C08K 5/3475* (2013.01);
(Continued)

(58) Field of Classification Search
CPC ........ C08L 67/02; C08L 69/00; C08L 69/005; C08L 2201/08; C08L 2205/025;
(Continued)

(56) References Cited

U.S. PATENT DOCUMENTS

| 4,216,253 A | 8/1980 | Bonnebat et al. |
| 5,142,018 A | 8/1992 | Sakashita et al. |

(Continued)

FOREIGN PATENT DOCUMENTS

| DE | 10330722 | 2/2005 |
| EP | 1029650 A1 | 8/2000 |

(Continued)

OTHER PUBLICATIONS

CAS Registry No. 70321-86-7, SciFinder, American Chemical Society. (Year: 2019).*

(Continued)

*Primary Examiner* — Josephine L Chang
(74) *Attorney, Agent, or Firm* — Cantor Colburn LLP

(57) ABSTRACT

A composition includes specific amounts of an amorphous polycarbonate, a partially crystalline polyester, and an ultraviolet absorbing agent comprising a hydroxyaryl group and a hydrogen-bond accepting group. The ultraviolet absorbing agent has a lambda-max less than 400 nanometers. The composition excludes white pigments, and colorants having a lambda-max of 400 to 700 nanometers. The composition is useful for forming a near infrared laser-transmissive part in a laser welded article that further includes a near infrared laser-absorbing part.

15 Claims, 1 Drawing Sheet

(51) Int. Cl.
*C08K 5/132* (2006.01)
*C08K 5/3475* (2006.01)
*C08K 5/3492* (2006.01)

(52) U.S. Cl.
CPC ............ *C08K 5/3492* (2013.01); *C08L 69/00* (2013.01); *C08L 69/005* (2013.01); *C08L 2201/08* (2013.01); *C08L 2205/025* (2013.01); *C08L 2205/03* (2013.01)

(58) Field of Classification Search
CPC ... C08L 2205/03; C08K 5/3492; C08K 5/132; C08K 5/3475
USPC .......................................................... 524/91
See application file for complete search history.

(56) References Cited

U.S. PATENT DOCUMENTS

| | | | |
|---|---|---|---|
| 5,151,491 | A | 9/1992 | Sakashita et al. |
| 6,504,002 | B1 | 1/2003 | Karlik et al. |
| 7,166,669 | B2 | 1/2007 | Joachimi et al. |
| 7,286,563 | B2 | 10/2007 | Chang et al. |
| 7,396,428 | B2 | 7/2008 | Matsushima et al. |
| 7,485,675 | B2 | 2/2009 | Koshida et al. |
| 7,544,405 | B2 | 6/2009 | Lepage |
| 7,772,415 | B2 | 8/2010 | Keller et al. |
| 8,052,830 | B2 | 11/2011 | Sakata et al. |
| 8,318,843 | B2 | 11/2012 | Benten et al. |
| RE44,290 | E | 6/2013 | Kihara et al. |
| 8,586,183 | B2 * | 11/2013 | Farrell .................... C08L 67/02 156/272.8 |
| 2003/0065129 | A1 | 4/2003 | McCloskey et al. |
| 2005/0119377 | A1 | 6/2005 | Ishii et al. |
| 2005/0153149 | A1 | 7/2005 | Sakane et al. |
| 2005/0165176 | A1 | 7/2005 | Matsushima et al. |
| 2007/0129475 | A1 | 6/2007 | Sakata et al. |
| 2007/0276069 | A1 * | 11/2007 | Agarwal .................. C08L 67/02 524/394 |
| 2009/0130451 | A1 | 5/2009 | Farrell |
| 2011/0207839 | A1 | 8/2011 | Bussels et al. |
| 2011/0256406 | A1 | 10/2011 | Farrell et al. |
| 2011/0306707 | A1 | 12/2011 | Benten et al. |
| 2012/0322913 | A1 | 12/2012 | Fontenot, III et al. |
| 2013/0320276 | A1 | 12/2013 | Farrell |
| 2014/0179855 | A1 * | 6/2014 | Farrell .................... C08L 67/02 524/494 |

FOREIGN PATENT DOCUMENTS

| | | | |
|---|---|---|---|
| EP | 1595920 | A1 | 11/2005 |
| EP | 1353990 | B1 | 6/2006 |
| EP | 1353991 | B1 | 6/2006 |
| JP | 2003292752 | A | 10/2003 |
| JP | 2010070626 | A | 4/2010 |
| WO | WO-2011120198 | A1 * | 10/2011 ............. C08G 64/06 |

OTHER PUBLICATIONS

International Search Report dated Aug. 19, 2015; International Application No. PCT/IB2015/053687; International Filing Date May 19, 2015 (4 pages).

Valox Resin 195 Data Sheet; Downloaded from www.sabic-ip.com on Jun. 2, 2014.

Written Opinion dated Aug. 19, 2015; International Application No. PCT/IB2015/053687; International Filing Date May 19, 2015 (4 pages).

* cited by examiner

THERMOPLASTIC COMPOSITION AND LASER-WELDED ARTICLE

CROSS-REFERENCE TO RELATED APPLICATIONS

This application is a National Stage application of PCT/IB2015/053687, filed May 19, 2015, which claims the benefit of U.S. Provisional Application No. 62/008,134, filed Jun. 5, 2014, both of which are incorporated by reference herein in their entirety.

BACKGROUND OF THE INVENTION

Thermoplastic compositions are often used in the manufacture of products requiring the joining of separate previously-formed articles, such as through laser-welding. Near-infrared (NIR) laser-welding of two polymer articles by transmission welding requires one of the polymer articles to be at least partially transparent to NIR laser light, and the other to absorb a significant amount of the NIR laser light. The laser passes through the first laser transparent layer and is absorbed by the second polymer layer, generating heat in the exposed area. External pressure is applied to ensure uninterrupted contact and heat conduction between the parts resulting in the melting of both the absorbing and the transmitting polymers, thus generating a weld at the interface.

The level of NIR transmission in the upper part should allow sufficient laser density at the interface to facilitate effective welding. Otherwise, the joining of the two materials by laser transmission welding is either difficult or restricted to slow scan speeds, which undesirably lengthens the part assembly cycle time. Partially crystalline polyesters, such as poly(butylene terephthalate), are materials that can easily disperse the incoming radiation through a combination of back scattering and internal diffusion, thereby causing unwanted broadening of the NIR laser beam. Consequently, the laser energy at the joining interface is diminished and the adhesion between the two layers is reduced. Scattering effects are greatly enhanced when fillers such as glass fibers are present, especially when the upper layer thickness is greater than 1 millimeter. Additionally, the internal scattering of the laser in the first (upper) part can bring about a rise in temperature, especially in thick walled parts. Coupled with the fact that the crystallization pattern across a complex part varies, it is therefore beneficial to have high and consistent laser transparency across a range of thicknesses and processing conditions of the part to achieve consistent weld strengths.

Several methods have been investigated to increase the NIR laser transparency of compositions based on partially crystalline polyesters. One approach is to blend the partially crystalline polyester with an amorphous resin such as polycarbonate or polyestercarbonate. Such compositions are disclosed, for example, in U.S. Pat. No. 7,396,428 B2 to Matsushima et al. and U.S. Pat. No. 8,052,830 B2 to Sakata et al., and U.S. Patent Application Publication No. US 2011/0256406 A1 of Farrell et al. However, further improvements in NIR laser transparency are desired.

An alternative approach to increase NIR laser transparency is to speed up the rate of crystallization of the composition using a chemical nucleant. This can occur by chemical reaction between the nucleating agent and polymeric end groups of the partially crystalline polyester to produce ionic end groups that enhance the rate of crystallization. Such compositions are disclosed, for example, in U.S. Pat. No. 8,318,843 B2 to Benten et al., and U.S. Patent Application Publication No. US 2011/0306707 A1 of Benten et al. The addition of such chemical nucleants, however, can lower the molecular weight of the partially crystalline polyester and lead to unstable melt viscosity. Additionally, such chemical nucleants can substantially degrade the amorphous resin, causing unstable melt viscosities and other undesirable defects such as splay and jetting (deformations due to turbulent flow).

There remains a need for increased NIR laser transparency in compositions based on partially crystalline polyesters.

BRIEF SUMMARY OF EMBODIMENTS OF THE INVENTION

One embodiment is a composition comprising 20 to 79.95 weight percent of an amorphous polycarbonate; 20 to 79.95 weight percent of a partially crystalline polyester comprising poly(butylene terephthalate), poly(ethylene terephthalate), poly(butylene terephthalate) copolymers, poly(ethylene terephthalate) copolymers, or a combination thereof; 0.05 to 2 weight percent of an ultraviolet absorbing agent comprising a hydroxyaryl group and a hydrogen-bond accepting group; wherein the ultraviolet absorbing agent has a lambda-max less than 400 nanometers measured in solution; wherein the composition excludes white pigments, and colorants having a lambda-max of 400 to 700 nanometers; and wherein all weight percent values are based on the total weight of the composition.

Another embodiment is a laser welded article comprising a near infrared laser-transmissive part comprising the composition described above, and a near infrared laser-absorbing part.

These and other embodiments are described in detail below.

DETAILED DESCRIPTION OF THE INVENTION

Figure 1:
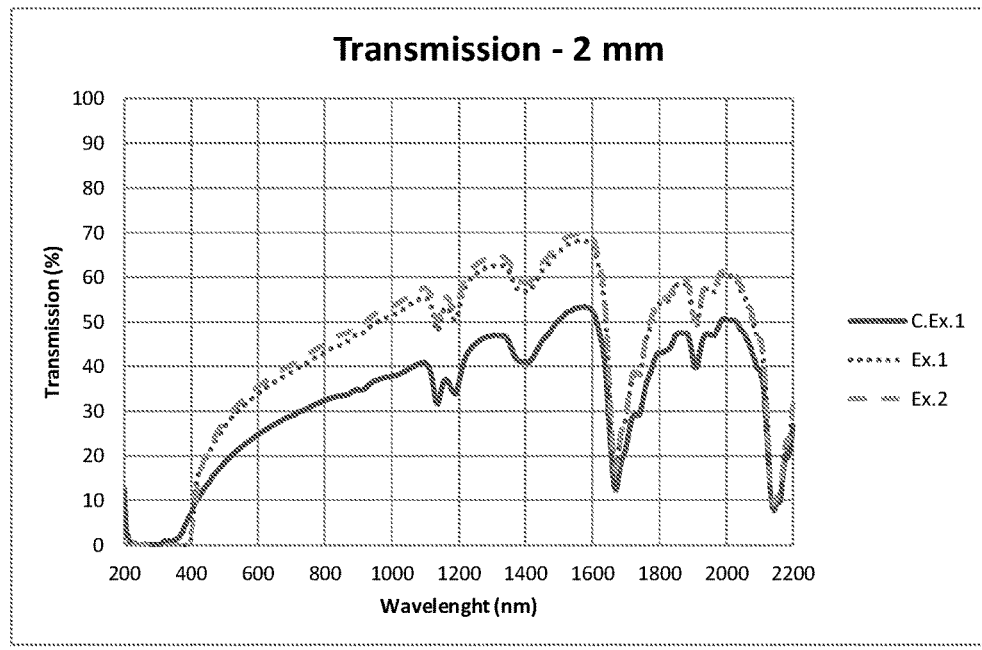
FIG. 1 is a plot of percent transmittance versus wavelength for 2 millimeter thick articles molded from the compositions of Comparative Example 1, Example 1, and Example 2.

The present inventor has determined that increased NIR laser transparency and decreased NIR laser reflectivity are exhibited when an ultraviolet absorbing agent having a hydroxyaryl group and an associated hydrogen-bond accepting group is added to a composition comprising a partially crystalline polyester and an amorphous polycarbonate.

Thus, one embodiment is a composition comprising 20 to 79.95 weight percent of an amorphous polycarbonate; 20 to 79.95 weight percent of a partially crystalline polyester comprising poly(butylene terephthalate), poly(ethylene terephthalate), poly(butylene terephthalate) copolymers, poly(ethylene terephthalate) copolymers, or a combination thereof; 0.05 to 2 weight percent of an ultraviolet absorbing agent comprising a hydroxyaryl group and a hydrogen-bond accepting group; wherein the ultraviolet absorbing agent has a lambda-max less than 400 nanometers measured in solution; wherein the composition excludes white pigments, and colorants having a lambda-max of 400 to 700 nanometers; and wherein all weight percent values are based on the total weight of the composition.

The composition comprises an amorphous polycarbonate. Amorphous polycarbonate as used herein means a polymer or copolymer having repeating structural carbonate units of the formula

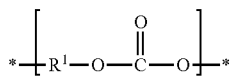

wherein at least 60 percent of the total number of $R^1$ groups are aromatic. Specifically, each $R^1$ can be derived from a dihydroxy compound such as an aromatic dihydroxy compound of the formula

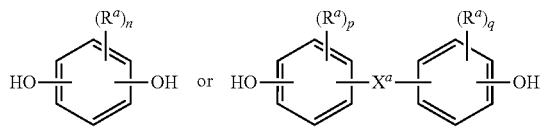

wherein n, p, and q are each independently 0, 1, 2, 3, or 4; $R^a$ is independently at each occurrence halogen, or unsubstituted or substituted $C_{1-10}$ hydrocarbyl; and $X^a$ is a single bond, —O—, —S—, —S(O)—, —S(O)$_2$—, —C(O)—, or a $C_{1-18}$ hydrocarbylene, which can be cyclic or acyclic, aromatic or non-aromatic, and can further comprise one or more heteroatoms selected from halogens, oxygen, nitrogen, sulfur, silicon, or phosphorous. As used herein, the term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. As used herein, "substituted" means including at least one substituent such as a halogen (i.e., F, Cl, Br, I), hydroxyl, amino, thiol, carboxyl, carboxylate, amide, nitrile, sulfide, disulfide, nitro, $C_{1-18}$ alkyl, $C_{1-18}$ alkoxyl, $C_{6-18}$ aryl, $C_{6-18}$ aryloxyl, $C_{7-18}$ alkylaryl, or $C_{7-18}$ alkylaryloxyl. So, when the hydrocarbyl residue is described as substituted, it can contain heteroatoms in addition to carbon and hydrogen.

Some illustrative examples of specific dihydroxy compounds include the following: bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, and 2,3,5,6-tetrabromo hydroquinone.

Specific dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane (DMBPC), 1,1-bis(4-hydroxy-3-methylphenyl)-3,3,5-trimethylcyclohexane (isophorone bisphenol), and combinations thereof.

In some embodiments, at least 90 percent of the total number of $R^1$ groups in the polycarbonate have the formula

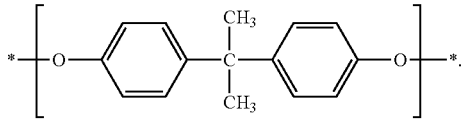

In some embodiments, the polycarbonate comprises or consists of bisphenol A polycarbonate resin.

More than one polycarbonate can be used. For example, the composition can comprise a first polycarbonate having a weight average molecular weight of 18,000 to 25,000 atomic mass units and a second polycarbonate having a weight average molecular weight of 27,000 to 35,000 atomic mass units.

Methods of forming polycarbonates are known, and many are commercially available from suppliers including SABIC Innovative Plastics, Bayer Material Science, and Mitsubishi Chemical Corp.

In some embodiments, the amorphous polycarbonate has a terminal hydroxyaryl group content of less than or equal to 300 parts per million by weight and an internal hydroxyaryl (Fries rearrangement) content of less than or equal to 150 parts per million by weight. For example, when the amorphous polycarbonate is a bisphenol A polycarbonate, the terminal hydroxyaryl group can have the structure

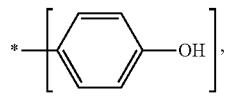

and the internal hydroxyaryl (Fries rearrangement) group can have the structure

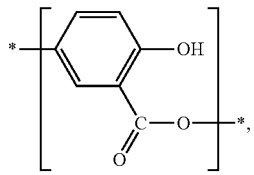

The composition comprises the amorphous polycarbonate in an amount of 20 to 79.95 weight percent, based on the total weight of the composition. Within this range, the amorphous polycarbonate amount can be 30 to 69.9 weight percent, specifically 40 to 59.8 weight percent.

In addition to the amorphous polycarbonate, the composition comprises a partially crystalline polyester comprising poly(butylene terephthalate), poly(ethylene terephthalate), poly(butylene terephthalate) copolymers, poly(ethylene terephthalate) copolymers, or a combination thereof.

When the partially crystalline polyester comprises a poly(butylene terephthalate) copolymer, it comprises repeat units in addition to the butylene terephthalate repeat units. Specifically, in addition to the butylene units, the copolymer can comprise alkylene groups having other alkylene units having 2 to 18 carbon atoms. Examples of such alkylene units are ethylene, 1,3-propylene, 1,5-pentylene, 1,6-hexylene, 2,2,4,4-tetramethyl-1,3-cyclobutylene, 1,4-cyclohexylene, 1,4-cyclohexanedimethylene, and combinations thereof. In addition to the terephthalate units, the copolymer can comprise isophthalate units.

When the partially crystalline polyester comprises a poly(ethylene terephthalate) copolymer, it comprises repeat units in addition to the ethylene terephthalate repeat units. Specifically, in addition to the ethylene units, the copolymer can comprise alkylene groups having other alkylene units having 3 to 18 carbon atoms. Examples of such alkylene units are 1,3-propylene, 1,4-butylene, 1,5-pentylene, 1,6-hexylene, 2,2,4,4-tetramethyl-1,3-cyclobutylene, 1,4-cyclohexylene, 1,4-cyclohexanedimethylene, and combinations thereof. In addition to the terephthalate units, the copolymer can comprise isophthalate units.

In some embodiments, the partially crystalline polyester comprises poly(butylene terephthalate).

The composition comprises the partially crystalline polyester in an amount of 20 to 79.95 weight percent, based on the total weight of the composition. Within this range, the partially crystalline polyester amount can be 30 to 69.9 weight percent, specifically 40 to 59.8 weight percent.

In addition to the amorphous polycarbonate and the partially crystalline polyester, the composition comprises an ultraviolet absorbing agent comprising a hydroxyaryl group and a hydrogen-bond accepting group, wherein the ultraviolet absorbing agent has a lambda-max less than 400 nanometers measured in solution. In some embodiments, the hydrogen-bond accepting group is capable of hydrogen bonding with the hydroxyaryl group.

In some embodiments, the ultraviolet absorbing agent is not a polycarbonate. In some embodiments, the ultraviolet absorbing agent is non-polymeric (i.e., not a polymer).

Suitable classes of ultraviolet absorbing agents include hydroxyarylbenzotriazoles, hydroxyarylbenzophenones, hydroxyaryltriazines, and combinations thereof. In some embodiments, the ultraviolet absorbing agent comprises an unsubstituted or substituted 2-(2-hydroxylphenyl)benzotriazole, an unsubstituted or substituted 2-hydroxybenzophenone, an unsubstituted or substituted 2-(2-hydroxyphenyl)-1,3,5-triazine, or a combination thereof.

In some embodiments, the hydrogen bonding of the hydroxyaryl group and the hydrogen-bond accepting group form a six-membered ring.

Specific examples of ultraviolet absorbing agents include 2-(2-hydroxy-3-t-butyl-5-methylphenyl)-5-chlorobenzotriazole, 2-(2-hydroxy-3,5-di-t-butylphenyl)benzotriazole, 2-(2-hydroxy-3,5-di-t-butylphenyl)-5-chlorobenzotriazole, 2-(2-hydroxy-3-sec-butyl-5-t-butylphenyl)benzotriazole, 2-(2-hydroxy-3,5-di-t-pentylphenyl)benzotriazole, 2-(2-hydroxy-3,5-di-(1-methyl-1-phenylethyl)phenyl)benzotriazole, 2-(2-hydroxy-5-t-octylphenyl)benzotriazole, 2-hydroxy-4-octyloxybenzophenone, 2-(4,6-diphenyl-1,3,5-triazin-2-yl)-5-[(hexyl)oxy]-phenol, or a combination thereof.

In some embodiments, the ultraviolet absorbing agent comprises 2-(2-hydroxy-5-t-octylphenyl)benzotriazole, 2-hydroxy-4-octyloxybenzophenone, 2-(4,6-diphenyl-1,3,5-triazin-2-yl)-5-[(hexyl)oxy]-phenol, or a combination thereof.

The ultraviolet absorbing agent has a lambda-max less than 400 nanometers measured in solution. In some embodiments, lambda-max is measured at 23° C. in a solution comprising chloroform, ethyl acetate, or a combination thereof. The lambda-max can be determined using an ultraviolet-visible spectrophotometer. In some embodiments, a path length of 1 centimeter is used, and the solution ultraviolet absorbing agent has a concentration effective to produce an absorbance in the range 0.1 to 2.0, specifically 0.2 to 1.5, at lambda-max.

The composition comprises the ultraviolet absorbing agent in an amount of 0.05 to 2 weight percent, based on the total weight of the composition. Within this range, the ultraviolet absorbing agent amount can be 0.1 to 1.5 weight percent, specifically 0.1 to 1.0 weight percent, more specifically 0.2 to 0.8 weight percent, even more specifically 0.2 to 0.6 weight percent.

The composition excludes white pigment, and colorants having a lambda-max of 400 to 700 nanometers. In some embodiments, lambda-max values of the colorants are measured at 23° C. in a solution comprising chloroform, ethyl acetate, or a combination thereof. In some embodiments, the composition excludes any colored pigment.

In some embodiments, the composition comprises 0 to less than 5 weight percent of fillers. In some embodiments, the composition excludes fillers.

The composition can, optionally, minimize or exclude polymers other than the amorphous polycarbonate and the partially crystalline polyester. For example, in some embodiments, the composition excludes polyestercarbonates. In some embodiments, the composition excludes polycarbonate-polysiloxane block copolymers. In some embodiments, the composition excludes impact modifiers. In some embodiments, the composition excludes any polymer other than the amorphous polycarbonate and the partially crystalline polyester.

The composition can, optionally, include one or more additives in addition to the ultraviolet absorbing agent. Such additives include, for example, flow modifiers, antioxidants, heat stabilizers, plasticizers, lubricants, mold release agents, antistatic agents, anti-fog agents, antimicrobial agents, radiation stabilizers, flame retardants, anti-drip agents (e.g., a styrene-acrylonitrile copolymer-encapsulated polytetrafluoroethylene (TSAN)), and combinations thereof. In general, the additives, when present, are used in a total amount of less than or equal to 5 weight percent, based on the total weight of the composition. Within this limit, the additives can be used in a total amount of less than or equal to 2 weight percent, specifically less than or equal to 1.5 weight percent, more specifically less than or equal to 1 weight percent. In some embodiments, the composition excludes flame retardants.

In a very specific embodiment of the composition, the amorphous polycarbonate comprises repeat units having the formula

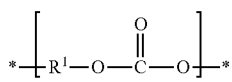

wherein at least 90 percent of the total number of R$^1$ groups have the formula

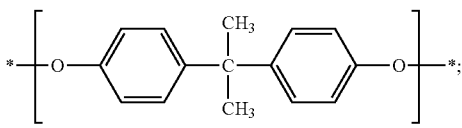

the partially crystalline polyester component comprises poly(butylene terephthalate); the ultraviolet absorbing agent comprises 2-(2-hydroxy-5-t-octylphenyl)benzotriazole (UVA 5411), 4-(octyloxy)-2-hydroxybenzophenone, or a combination thereof; the composition comprises 40 to 59.8 weight percent of the amorphous polycarbonate, 40 to 59.8 weight percent of the partially crystalline polyester, and 0.2 to 0.8 weight percent of the ultraviolet absorbing agent; the composition excludes fillers; the composition excludes any polymer other than the amorphous polycarbonate and the partially crystalline polyester; and the composition excludes flame retardant.

Another embodiment is a laser welded article comprising a near infrared laser-transmissive part, and a near infrared laser-absorbing part, wherein the near infrared laser-transmissive part comprises a composition comprising 20 to 79.95 weight percent of an amorphous polycarbonate; 20 to 79.95 weight percent of a partially crystalline polyester comprising poly(butylene terephthalate), poly(ethylene terephthalate), poly(butylene terephthalate) copolymers, poly(ethylene terephthalate) copolymers, or a combination thereof; 0.05 to 2 weight percent of an ultraviolet absorbing agent comprising a hydroxyaryl group and a hydrogen-bond accepting group; wherein the ultraviolet absorbing agent has a lambda-max less than 400 nanometers measured in solution; wherein the composition excludes white pigments, and colorants having a lambda-max of 400 to 700 nanometers; and wherein all weight percent values are based on the total weight of the composition.

All of the variations described above in the context of the composition apply as well to the composition of the near infrared laser-transmissive part.

In some embodiments of the laser welded article, the amorphous polycarbonate comprises repeat units having the formula

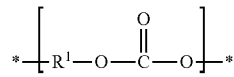

wherein at least 90 percent of the total number of R$^1$ groups have the formula

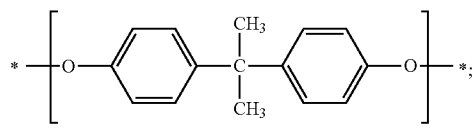

the partially crystalline polyester component comprises poly(butylene terephthalate); the ultraviolet absorbing agent comprises 2-(2-hydroxy-5-t-octylphenyl)benzotriazole (UVA 5411), 4-(octyloxy)-2-hydroxybenzophenone, or a combination thereof; the composition comprises 40 to 59.8 weight percent of the amorphous polycarbonate, 40 to 59.8 weight percent of the partially crystalline polyester, and 0.2 to 0.8 weight percent of the ultraviolet absorbing agent; the composition excludes fillers; the composition excludes any polymer other than the amorphous polycarbonate and the partially crystalline polyester; and the composition excludes flame retardant.

All ranges disclosed herein are inclusive of the endpoints, and the endpoints are independently combinable with each other. Each range disclosed herein constitutes a disclosure of any point or sub-range lying within the disclosed range.

The invention includes at least the following embodiments.

Embodiment 1

A composition comprising: 20 to 79.95 weight percent of an amorphous polycarbonate; 20 to 79.95 weight percent of a partially crystalline polyester comprising poly(butylene terephthalate), poly(ethylene terephthalate), poly(butylene terephthalate) copolymers, poly(ethylene terephthalate) copolymers, or a combination thereof; 0.05 to 2 weight percent of an ultraviolet absorbing agent comprising a hydroxyaryl group and a hydrogen-bond accepting group; wherein the ultraviolet absorbing agent has a lambda-max less than 400 nanometers measured in solution; wherein the composition excludes white pigments, and colorants having a lambda-max of 400 to 700 nanometers; and wherein all weight percent values are based on the total weight of the composition.

Embodiment 2

The composition of embodiment 1, wherein the ultraviolet absorbing agent comprises an unsubstituted or substituted 2-(2-hydroxylphenyl)benzotriazole, an unsubstituted or substituted 2-hydroxybenzophenone, an unsubstituted or substituted 2-(2-hydroxyphenyl)-1,3,5-triazine, or a combination thereof.

Embodiment 3

The composition of embodiment 1, wherein the ultraviolet absorbing agent comprises 2-(2-hydroxy-3-t-butyl-5-methylphenyl)-5-chlorobenzotriazole, 2-(2-hydroxy-3,5-di-t-butylphenyl)benzotriazole, 2-(2-hydroxy-3,5-di-t-butylphenyl)-5-chlorobenzotriazole, 2-(2-hydroxy-3-sec-butyl-5-t-butylphenyl)benzotriazole, 2-(2-hydroxy-3,5-di-t-pentylphenyl)benzotriazole, 2-(2-hydroxy-3,5-di-(1-methyl-1-phenylethyl)phenyl)benzotriazole, 2-(2-hydroxy-5-t-octylphenyl)benzotriazole, 2-hydroxy-4-octyloxybenzophenone, 2-(4,6-diphenyl-1,3,5-triazin-2-yl)-5-[(hexyl)oxy]-phenol, or a combination thereof.

Embodiment 4

The composition of embodiment 1, wherein the ultraviolet absorbing agent comprises 2-(2-hydroxy-5-t-octylphenyl)benzotriazole, 2-hydroxy-4-octyloxybenzophenone, 2-(4,6-diphenyl-1,3,5-triazin-2-yl)-5-[(hexyl)oxy]-phenol, or a combination thereof.

Embodiment 5

The composition of any of embodiments 1-4, wherein the amorphous polycarbonate has a terminal hydroxyaryl group content of less than or equal to 300 parts per million by weight and an internal hydroxyaryl content of less than or equal to 150 parts per million by weight.

Embodiment 6

The composition of any of embodiments 1-5, wherein the amorphous polycarbonate comprises repeat units having the formula

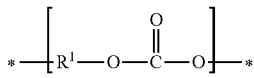

wherein at least 60 percent of the total number of $R^1$ groups are aromatic.

Embodiment 7

The composition of embodiment 6, wherein $R^1$ is the residue of a dihydroxy compound having the formula

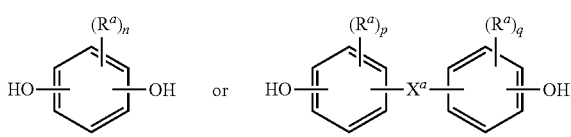

wherein n, p, and q are each independently 0, 1, 2, 3, or 4; $R^a$ is independently at each occurrence halogen, or unsubstituted or substituted $C_{1-10}$ hydrocarbyl; and $X^a$ is a single bond, —O—, —S—, —S(O)—, —S(O)$_2$—, —C(O)—, or $C_{1-18}$ hydrocarbylene, which can be cyclic or acyclic, aromatic or non-aromatic, and can further comprise one or more heteroatoms selected from halogens, oxygen, nitrogen, sulfur, silicon, or phosphorous.

Embodiment 8

The composition of embodiment 6, wherein at least 90 percent of the total number of $R^1$ groups have the formula

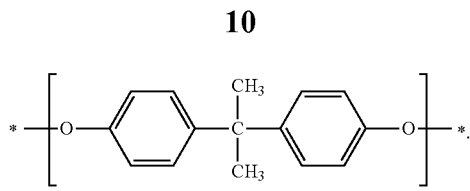

Embodiment 9

The composition of any of embodiments 1-8, wherein the partially crystalline polyester comprises poly(butylene terephthalate).

Embodiment 10

The composition of any of embodiments 1-9, wherein the composition comprises 0 to less than 5 weight percent of fillers.

Embodiment 11

The composition of any of embodiments 1-10, wherein the composition excludes polyestercarbonate.

Embodiment 12

The composition of any of embodiments 1-11, wherein the composition excludes polycarbonate-polysiloxane block copolymer.

Embodiment 13

The composition of any of embodiments 1-12, wherein the composition excludes impact modifier.

Embodiment 14

The composition of any of embodiments 1-13, wherein the composition excludes any polymer other than the amorphous polycarbonate and the partially crystalline polyester.

Embodiment 15

The composition of any of embodiments 1-14, wherein the composition excludes flame retardant.

Embodiment 16

The composition of embodiment 1, wherein the amorphous polycarbonate comprises repeat units having the formula

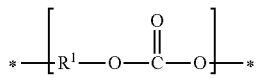

wherein at least 90 percent of the total number of $R^1$ groups have the formula

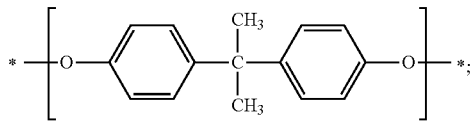

wherein the partially crystalline polyester component comprises poly(butylene terephthalate); wherein the ultraviolet absorbing agent comprises 2-(2-hydroxy-5-t-octylphenyl)benzotriazole (UVA 5411), 4-(octyloxy)-2-hydroxybenzophenone, 2-(4,6-diphenyl-1,3,5-triazin-2-yl)-5-[(hexyl)oxy]-phenol, or a combination thereof; wherein the composition comprises 40 to 59.8 weight percent of the amorphous polycarbonate, 40 to 59.8 weight percent of the partially crystalline polyester, and 0.2 to 0.8 weight percent of the ultraviolet absorbing agent; wherein the composition excludes fillers; wherein the composition excludes any polymer other than the amorphous polycarbonate and the partially crystalline polyester; and wherein the composition excludes flame retardant.

Embodiment 17

A laser welded article comprising: a near infrared laser-transmissive part; and a near infrared laser-absorbing part; wherein the near infrared laser-transmissive part comprises a composition comprising 20 to 79.95 weight percent of an amorphous polycarbonate; 20 to 79.95 weight percent of a partially crystalline polyester comprising poly(butylene terephthalate), poly(ethylene terephthalate), poly(butylene terephthalate) copolymers, poly(ethylene terephthalate) copolymers, or a combination thereof; 0.05 to 2 weight percent of an ultraviolet absorbing agent comprising a hydroxyaryl group and a hydrogen-bond accepting group; wherein the ultraviolet absorbing agent has a lambda-max less than 400 nanometers measured in solution; wherein the composition excludes white pigments, and colorants having a lambda-max of 400 to 700 nanometers; and wherein all weight percent values are based on the total weight of the composition.

Embodiment 18

The laser welded article of embodiment 17, wherein the amorphous polycarbonate comprises repeat units having the formula

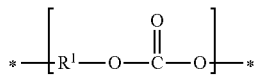

wherein at least 90 percent of the total number of R¹ groups have the formula

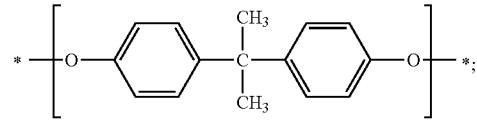

wherein the partially crystalline polyester component comprises poly(butylene terephthalate); wherein the ultraviolet absorbing agent comprises 2-(2-hydroxy-5-t-octylphenyl)benzotriazole (UVA 5411), 4-(octyloxy)-2-hydroxybenzophenone, 2-(4,6-diphenyl-1,3,5-triazin-2-yl)-5-[(hexyl)oxy]-phenol, or a combination thereof; wherein the composition comprises 40 to 59.8 weight percent of the amorphous polycarbonate, 40 to 59.8 weight percent of the partially crystalline polyester, and 0.2 to 0.8 weight percent of the ultraviolet absorbing agent; wherein the composition excludes fillers; wherein the composition excludes any polymer other than the amorphous polycarbonate and the partially crystalline polyester; and wherein the composition excludes flame retardant.

All cited patents, patent applications, and other references are incorporated herein by reference in their entirety, including the priority application, U.S. Patent Application No. 62/008,134, filed Jun. 5, 2014.

The invention is further illustrated by the following non-limiting examples.

Examples 1-3, Comparative Example 1

The components used to form compositions are summarized in Table 1.

TABLE 1

| Component | Description |
|---|---|
| PC 1 | Linear bisphenol A polycarbonate diphenyl ester, CAS Reg. No. 120968-15-2, produced via interfacial polymerization and having a weight average molecular weight of about 21,800 atomic mass units as determined by gel permeation chromatography using polycarbonate standards. |
| PC 2 | Linear bisphenol A polycarbonate diphenyl ester, CAS Reg. No. 120968-15-2, produced via melt polymerization and having a weight average molecular weight of about 21,700 atomic mass units as determined by gel permeation chromatography using polycarbonate standards. |
| PBT 1 | Poly(1,4-butylene terephthalate), CAS Reg. No. 26062-94-2, having an intrinsic viscosity of 0.66 deciliters/gram and a carboxylic acid (COOH) end group content of 17 milliequivalents COOH per kilogram resin; obtained as VALOX ™ 195 Resin from Sabic Innovative Plastics. |
| PBT 2 | Poly(1,4-butylene terephthalate), CAS Reg. No. 26062-94-2, having an intrinsic viscosity of about 1.2 deciliters/gram and a carboxylic acid (COOH) end group content of 35 milliequivalents COOH per kilogram resin; obtained as VALOX ™ 315 Resin from Sabic Innovative Plastics. |
| UVA 1 | 2-(2-Hydroxy-5-t-octylphenyl)benzotriazole, CAS Reg. No. 3147-75-9; obtained as CYASORB ™ UV 5411 from Cytec. |
| UVA 2 | 4-Octyloxy-2-hydroxybenzophenone, CAS Reg. No. 1843-05-6; obtained as CYASORB ™ UV 531 from Cytec. |
| UVA 3 | 2-(4,6-Diphenyl-1,3,5-triazin-2-yl)-5-[(hexyl)oxy]-phenol, CAS Reg. No. 147315-50-2, obtained as TINUVIN ™ 1577 from BASF. |
| UVA 4 | Poly(4-(2-acryloxyethoxy)-2-hydroxybenzophenone), CAS Reg. No. 29963-76-6, obtained as CYASORB ™ 2126 from CYTEC. |

TABLE 1-continued

| Component | Description |
|---|---|
| MZP | Monozinc phosphate (ZnH$_2$PO$_4$), CAS Reg. No. 13598-37-3; obtained as Z21-82 from Chemische Fabrik Budenheim. |
| Antioxidant | Pentaerythritol tetrakis(3,5-di-tert-butyl-4-hydroxyhydrocinnamate), CAS Reg. No. 6683-19-8; obtained as IRGANOX ™ 1010 from BASF. |
| PETS | Pentaerythritol tetrastearate, CAS Reg. No. 115-83-3; obtained from Faci S.p.A. |
| Glass fiber | Glass fiber having a diameter of about 13 micrometers, a pre-compounded length of about 4 millimeters, and a surface treatment for compatibility with poly(ethylene terephthalate) and poly(butylene terephthalate); obtained as T-120 from Nippon Electric Glass. |

All solid additives were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The compositions were prepared by melt extrusion on a Werner & Pfleiderer 25 millimeter internal diameter twin-screw extruder, using a nominal melt temperature of 240 to 270° C., 25 inches (635 millimeters) of mercury vacuum, a throughput of about 20 kilograms per hour, and a screw rotation rate of 300 rotations per minute (rpm). The extrudate was pelletized and dried at about 120° C. for about 3 hours prior to use for injection molding.

Two millimeter thick parts for near infrared transmission and reflection measurements were injection molded in a 45-ton Engel injection molding machine operating at a barrel temperature of 250° C. and a mold temperature of 70° C. The near infrared (NIR) percent transmission and reflection values at 960 and 1064 nanometers were measured on the 2 millimeter thick molded parts using a Perkin-Elmer Lambda 950 spectrophotometer. Transmission and reflection curves are plotted in FIGS. 1 and 2, respectively.

Figure 2:
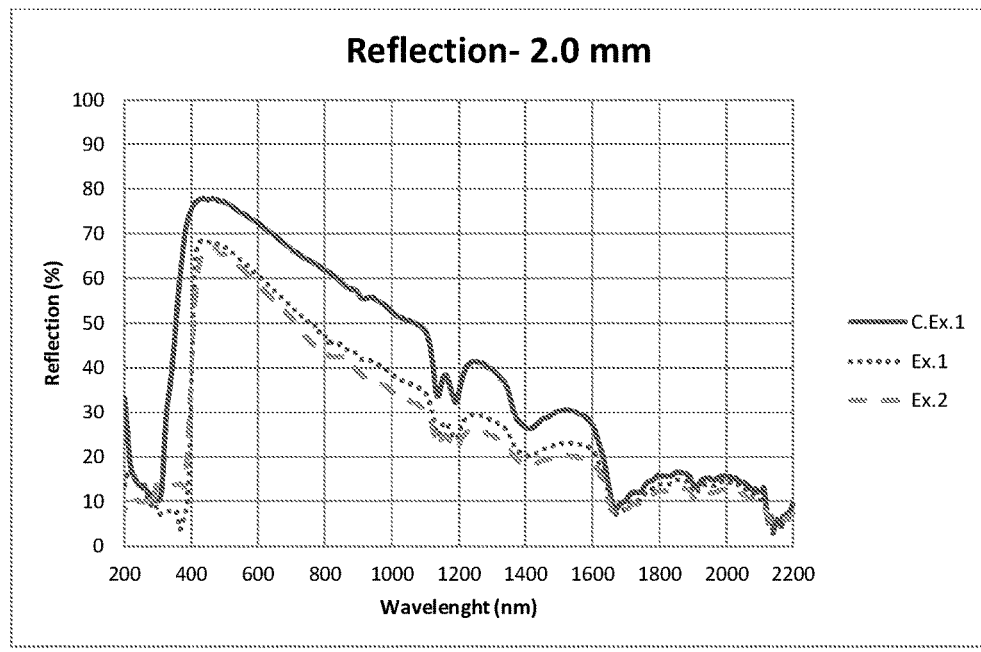
FIG. 2 is a plot of percent reflectance versus wavelength for 2 millimeter thick articles molded from the compositions of Comparative Example 1, Example 1, and Example 2.

These examples utilize a polycarbonate prepared by interfacial polymerization. Compositions and optical properties are summarized in Table 2, where component amounts are in weight percent based on the total weight of the composition. The property data in Table 2 and FIGS. 1 and 2 show that a substantial increase in near infrared transmittance and a substantial decrease in near infrared reflectance are observed on the addition of an ultraviolet absorbing agent comprising a hydroxyaryl group and a hydrogen-bond accepting group (Examples 1-3 versus Comparative Example 1).

TABLE 2

|  | C. Ex. 1 | Ex. 1 | Ex. 2 | Ex. 3 |
|---|---|---|---|---|
| COMPOSITIONS | | | | |
| PC 1 | 49.69 | 49.29 | 49.29 | 49.29 |
| PBT 1 | 50.00 | 50.00 | 50.00 | 50.00 |
| UVA 1 | 0.00 | 0.40 | 0.00 | 0.00 |
| UVA 2 | 0.00 | 0.00 | 0.40 | 0.00 |
| UVA 3 | 0.00 | 0.00 | 0.00 | 0.40 |
| Mono zinc phosphate | 0.05 | 0.05 | 0.05 | 0.05 |
| Antioxidant | 0.06 | 0.06 | 0.06 | 0.06 |
| PETS | 0.20 | 0.20 | 0.20 | 0.20 |
| PROPERTIES | | | | |
| NIR Transmission at 960 nm (%) | 37.1 | 50.3 | 52.3 | 48.1 |
| Transmission compared with C. Ex. 1 (%) | — | +13.2 | +15.2 | +11.0 |
| NIR Reflection at 960 nm (%) | 55.0 | 40.7 | 36.9 | — |

TABLE 2-continued

|  | C. Ex. 1 | Ex. 1 | Ex. 2 | Ex. 3 |
|---|---|---|---|---|
| Reflection compared with C. Ex. 1 (%) | — | −14.3 | −18.1 | — |
| NIR Transmission at 1064 nm (%) | 40.0 | 54.5 | 56.5 | 52.2 |
| Transmission compared with C. Ex. 1 (%) | — | +14.5 | +16.5 | +12.2 |
| NIR Reflection at 1064 nm (%) | 50.2 | 36.1 | 32.2 | — |
| Reflection compared with C. Ex. 1 (%) | — | −14.1 | −18.0 | — |

Examples 4 and 5, Comparative Example 2

These examples utilize a polycarbonate prepared by melt polymerization. The property data in Table 3 show that a substantial increase in near infrared transmittance is observed on the addition of an ultraviolet absorbing agent comprising a hydroxyaryl group and a hydrogen-bond accepting group (Examples 4 and 5 versus Comparative Example 2).

TABLE 3

|  | C. Ex. 2 | Ex. 4 | Ex. 5 |
|---|---|---|---|
| COMPOSITIONS | | | |
| PC 2 | 49.69 | 49.29 | 49.29 |
| PBT 1 | 50.00 | 50.00 | 50.00 |
| UVA 1 | 0.00 | 0.40 | 0.00 |
| UVA 2 | 0.00 | 0.00 | 0.40 |
| Mono zinc phosphate | 0.05 | 0.05 | 0.05 |
| Antioxidant | 0.06 | 0.06 | 0.06 |
| PETS | 0.20 | 0.20 | 0.20 |
| PROPERTIES | | | |
| NIR Transmission at 960 nm (%) | 64.8 | 80.8 | 76.2 |
| Transmission compared with C. Ex. 2 (%) | — | +16.0 | +11.4 |

Examples 6-8, Comparative Example 3

These examples utilize a polycarbonate prepared by melt polymerization and a mixture of two poly(butylene terephthalate) s. The property data in Table 4 show that a substantial increase in near infrared transmittance is observed on the addition of an ultraviolet absorbing agent comprising a hydroxyaryl group and a hydrogen-bond accepting group (Examples 6-8 versus Comparative Example 3).

TABLE 4

|  | C. Ex. 3 | Ex. 6 | Ex. 7 | Ex. 8 |
|---|---|---|---|---|
| COMPOSITIONS | | | | |
| PC 2 | 40 | 39.6 | 39.6 | 39.6 |
| PBT 1 | 29.7 | 29.7 | 29.7 | 29.7 |
| PBT 2 | 10 | 10 | 10 | 10 |
| UVA 1 | 0 | 0.40 | 0 | 0 |
| UVA 2 | 0 | 0 | 0.40 | 0 |
| UVA 4 | 0 | 0 | 0 | 0.40 |
| Mono zinc phosphate | 0.05 | 0.05 | 0.05 | 0.05 |
| Antioxidant | 0.06 | 0.06 | 0.06 | 0.06 |
| PETS | 0.20 | 0.20 | 0.20 | 0.20 |
| Glass fiber | 20 | 20 | 20 | 20 |
| PROPERTIES | | | | |
| NIR Transmission at 960 nm (%) | 62.3 | 74.9 | 68.8 | 75.7 |
| Transmission compared with C. Ex. 3 (%) | — | +12.6 | +6.5 | +13.4 |

The invention claimed is:

1. A composition comprising:
   20 to 79.95 weight percent of an amorphous polycarbonate produced via interfacial polymerization;
   20 to 79.95 weight percent of a partially crystalline polyester comprising poly(butylene terephthalate), poly(ethylene terephthalate), poly(butylene terephthalate) copolymers, poly(ethylene terephthalate) copolymers, or a combination thereof; and
   0.05 to 2 weight percent of an ultraviolet absorbing agent, wherein the ultraviolet absorbing agent comprises 2-(2-hydroxy-5-t-octylphenyl)benzotriazole, 2-hydroxy-4-octyloxybenzophenone, 2-(4,6-diphenyl-1,3,5-triazin-2-yl)-5-[(hexyl)oxy]-phenol, or a combination thereof;
   wherein the composition excludes white pigments, and colorants having a lambda-max of 400 to 700 nanometers;
   wherein all weight percent values are based on the total weight of the composition, and
   wherein the amorphous polycarbonate has a terminal hydroxyaryl group content of less than or equal to 300 parts per million by weight and an internal hydroxyaryl group content of less than or equal to 150 parts per million by weight.

2. The composition of claim 1, wherein the composition comprises 0 to less than 5 weight percent of fillers.

3. The composition of claim 1, wherein the composition excludes polyestercarbonates.

4. The composition of claim 1, wherein the composition excludes polycarbonate-polysiloxane block copolymers.

5. The composition of claim 1, wherein the composition excludes impact modifiers.

6. The composition of claim 1, wherein the composition excludes any polymer other than the amorphous polycarbonate and the partially crystalline polyester.

7. The composition of claim 1, wherein the composition excludes flame retardants.

8. The composition of claim 1, wherein the ultraviolet absorbing agent further comprises 2-(2-hydroxy-3-t-butyl-5-methylphenyl)-5-chlorobenzotriazole, 2-(2-hydroxy-3,5-di-t-butylphenyl)benzotriazole, 2-(2-hydroxy-3,5-di-t-butylphenyl)-5-chlorobenzotriazole, 2-(2-hydroxy-3-sec-butyl-5-t-butylphenyl)benzotriazole, 2-(2-hydroxy-3,5-di-t-pentylphenyl)benzotriazole, 2-(2-hydroxy-3,5-di-(1-methyl-1-phenylethyl)phenyl)benzotriazole, or a combination thereof.

9. The composition of claim 1, wherein the amorphous polycarbonate comprises repeat units having the formula

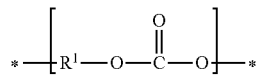

wherein at least 60 percent of the total number of $R^1$ groups are aromatic.

10. The composition of claim 9, wherein $R^1$ is the residue of a dihydroxy compound having the formula

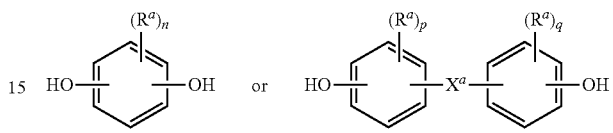

wherein n, p, and q are each independently 0, 1, 2, 3, or 4; $R^a$ is independently at each occurrence halogen, or unsubstituted or substituted $C_{1-10}$ hydrocarbyl; and $X^a$ is a single bond, —O—, —S—, —S(O)—, —S(O)$_2$—, —C(O)—, or $C_{1-18}$ hydrocarbylene, which can be cyclic or acyclic, aromatic or non-aromatic, and can further comprise one or more heteroatoms selected from halogens, oxygen, nitrogen, sulfur, silicon, or phosphorous.

11. The composition of claim 9, wherein at least 90 percent of the total number of $R^1$ groups have the formula

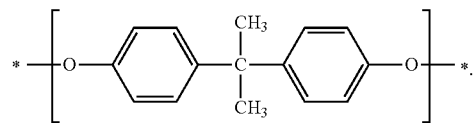

12. The composition of claim 1, wherein the partially crystalline polyester comprises poly(butylene terephthalate).

13. The composition of claim 1,
   wherein the amorphous polycarbonate comprises repeat units having the formula

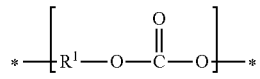

wherein at least 90 percent of the total number of $R^1$ groups have the formula

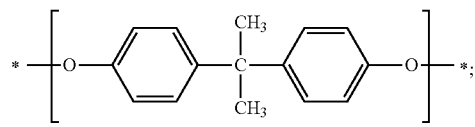

wherein the partially crystalline polyester component comprises poly(butylene terephthalate);
   wherein the composition comprises
      40 to 59.8 weight percent of the amorphous polycarbonate,
      40 to 59.8 weight percent of the partially crystalline polyester, and
      0.2 to 0.8 weight percent of the ultraviolet absorbing agent;
   wherein the composition excludes fillers;

wherein the composition excludes any polymer other than the amorphous polycarbonate and the partially crystalline polyester; and wherein the composition excludes flame retardant.

14. A laser welded article comprising:
a near infrared laser-transmissive part; and
a near infrared laser-absorbing part;
wherein the near infrared laser-transmissive part comprises a composition comprising
  20 to 79.95 weight percent of an amorphous polycarbonate produced via interfacial polymerization;
  20 to 79.95 weight percent of a partially crystalline polyester comprising poly(butylene terephthalate), poly(ethylene terephthalate), poly(butylene terephthalate) copolymers, poly(ethylene terephthalate) copolymers, or a combination thereof;
  0.05 to 2 weight percent of an ultraviolet absorbing agent, wherein the ultraviolet absorbing agent comprises 2-(2-hydroxy-5-t-octylphenyl)benzotriazole, 2-hydroxy-4-octyloxybenzophenone, 2-(4,6-diphenyl-1,3,5-triazin-2-yl)-5-[(hexyl)oxy]-phenol, or a combination thereof;
wherein the composition excludes white pigments, and colorants having a lambda-max of 400 to 700 nanometers;
wherein all weight percent values are based on the total weight of the composition; and
wherein the amorphous polycarbonate has a terminal hydroxyaryl group content of less than or equal to 300 parts per million by weight and an internal hydroxyaryl group content of less than or equal to 150 parts per million by weight.

15. The laser welded article of claim 14,
wherein the amorphous polycarbonate comprises repeat units having the formula

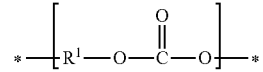

wherein at least 90 percent of the total number of $R^1$ groups have the formula

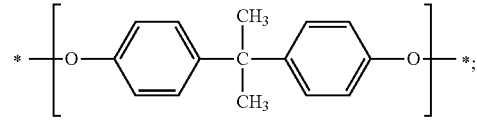

wherein the partially crystalline polyester component comprises poly(butylene terephthalate);
wherein the composition comprises
  40 to 59.8 weight percent of the amorphous polycarbonate,
  40 to 59.8 weight percent of the partially crystalline polyester, and
  0.2 to 0.8 weight percent of the ultraviolet absorbing agent;
wherein the composition excludes fillers;
wherein the composition excludes any polymer other than the amorphous polycarbonate and the partially crystalline polyester; and
wherein the composition excludes flame retardant.

* * * * *